United States Patent
Wang et al.

(10) Patent No.: US 12,000,861 B2
(45) Date of Patent: Jun. 4, 2024

(54) SYSTEM AND METHOD FOR A NON-TAPPING MODE SCATTERING-TYPE SCANNING NEAR-FIELD OPTICAL MICROSCOPY

(71) Applicant: Lehigh University, Bethlehem, PA (US)

(72) Inventors: Haomin Wang, Bethlehem, PA (US); Xiaoji Xu, Bethlehem, PA (US)

(73) Assignee: Lehigh University, Bethlehem, PA (US)

( * ) Notice: Subject to any disclaimer, the term of this patent is extended or adjusted under 35 U.S.C. 154(b) by 114 days.

(21) Appl. No.: 17/887,890

(22) Filed: Aug. 15, 2022

(65) Prior Publication Data

US 2022/0390485 A1 Dec. 8, 2022

Related U.S. Application Data

(63) Continuation of application No. 16/963,917, filed as application No. PCT/US2019/014572 on Jan. 22, 2019, now Pat. No. 11,415,597.

(60) Provisional application No. 62/620,263, filed on Jan. 22, 2018.

(51) Int. Cl.
*G01Q 60/06* (2010.01)
*G01Q 60/18* (2010.01)
*G01Q 60/22* (2010.01)

(52) U.S. Cl.
CPC ............. *G01Q 60/06* (2013.01); *G01Q 60/22* (2013.01); *G01Q 60/18* (2013.01)

(58) Field of Classification Search
CPC .......... G01Q 60/06; G01Q 60/22; G01Q 60/18
See application file for complete search history.

(56) References Cited

U.S. PATENT DOCUMENTS

| 5,519,212 | A  | * | 5/1996  | Elings    | G01Q 60/34  |
|           |    |   |         |           | 977/851     |
| 6,002,471 | A  | * | 12/1999 | Quake     | G01N 21/658 |
|           |    |   |         |           | 356/73      |
| 7,526,949 | B1 | * | 5/2009  | Liu       | G01Q 70/10  |
|           |    |   |         |           | 250/306     |
| 8,643,847 | B1 | * | 2/2014  | Chen      | G01B 11/2441|
|           |    |   |         |           | 356/516     |
| 9,739,798 | B2 | * | 8/2017  | Humphris  | G01Q 70/06  |
| 11,346,857| B1 | * | 5/2022  | Daugela   | G01N 29/46  |
| 11,835,546| B1 | * | 12/2023 | Daugela   | G01Q 60/366 |
| 2006/0065047| A1| * | 3/2006  | Blumberg  | G01Q 10/065 |
|           |    |   |         |           | 73/105      |

(Continued)

*Primary Examiner* — David A Vanore
(74) *Attorney, Agent, or Firm* — Boyle Fredrickson S.C.

(57) ABSTRACT

Systems, apparatuses, and methods for realizing a peak-force scattering scanning near-field optical microscopy (PF-SNOM). Conventional scattering-type microscopy (s-SNOM) techniques uses tapping mode operation and lock-in detections that do not provide direct tomographic information with explicit tip-sample distance. Using a peak force scattering-type scanning near-field optical microscopy with a combination of peak force tapping mode and time-gated light detection, PF-SNOM enables direct sectioning of vertical near-field signals from a sample surface for both three-dimensional near-field imaging and spectroscopic analysis. PF-SNOM also delivers a spatial resolution of 5 nm and can simultaneously measure mechanical and electrical properties together with optical near-field signals.

20 Claims, 9 Drawing Sheets

(56) References Cited

U.S. PATENT DOCUMENTS

| | | | |
|---|---|---|---|
| 2008/0266575 A1* | 10/2008 | Gaitas | B82Y 35/00 |
| | | | 356/600 |
| 2011/0187798 A1* | 8/2011 | Rogers | B41J 2/06 |
| | | | 347/55 |
| 2018/0052186 A1* | 2/2018 | Su | G01N 21/35 |
| 2020/0096332 A1* | 3/2020 | Hu | G01B 21/30 |
| 2022/0082583 A1* | 3/2022 | Baur | G01Q 30/04 |
| 2022/0390485 A1* | 12/2022 | Wang | G01Q 60/06 |

\* cited by examiner

| TIP-SAMPLE DISTANCE (nm) | POINT | LOCATION 1 FWHM (cm⁻¹) | LOCATION 1 PEAK FREQUENCY (cm⁻¹) | LOCATION 2 FWHM (cm⁻¹) | LOCATION 2 PEAK FREQUENCY (cm⁻¹) | LOCATION 3 FWHM (cm⁻¹) | LOCATION 3 PEAK FREQUENCY (cm⁻¹) |
|---|---|---|---|---|---|---|---|
| 1 | | 13.7 ± 2.4 | 1406 ± 1 | 10.3 ± 2.1 | 1395 ± 1 | 7.3 ± 0.8 | 1391 ± 1 |
| 3.5 | | 12.3 ± 3.1 | 1408 ± 1 | 8.5 ± 2.0 | 1396 ± 1 | 6.6 ± 1.8 | 1391 ± 1 |
| 6.5 | | 11.1 ± 4.1 | 1409 ± 1 | 7.4 ± 2.5 | 1397 ± 1 | 5.8 ± 2.7 | 1392 ± 1 |
FIG.3D
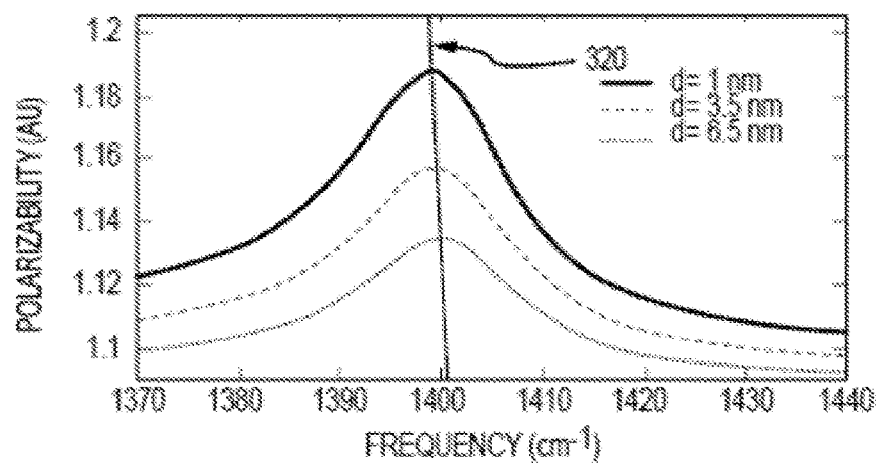
FIG.3E
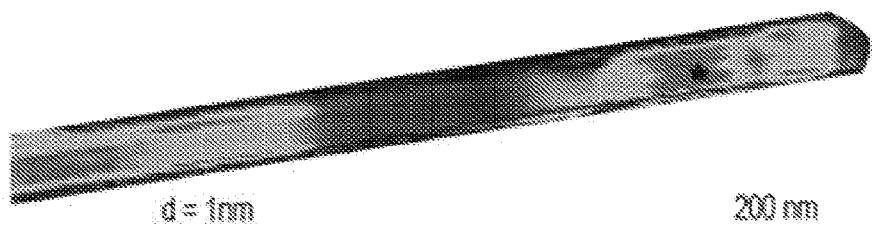
FIG.3F d = 4 nm   200 nm

SYSTEM AND METHOD FOR A NON-TAPPING MODE SCATTERING-TYPE SCANNING NEAR-FIELD OPTICAL MICROSCOPY

CROSS-REFERENCE TO RELATED APPLICATIONS

This application is a continuation of U.S. Non-Provisional application Ser. No. 16/963,917, filed Jul. 22, 2020, which is a national stage of PCT/US2019/014572, filed Jan. 22, 2019, which claims the benefit of U.S. Provisional Application No. 62/620,263, filed Jan. 22, 2018, each of which is incorporated by reference in its entirety herein for all purposes.

BACKGROUND

Scanning Near-Field Optical Microscopy (SNOM—also sometimes called Near-Field Scanning Optical Microscopy—NSOM) is a microscopy technique for nanostructure investigation. In SNOM (as referenced hereinafter), a laser light is focused through an aperture with a diameter smaller than an excitation wavelength of the laser light, resulting in an evanescent field (or near-field) on the far side of the aperture. When a sample is scanned at a small distance below the aperture, the transmitted or reflected light is captured and displayed through a display apparatus with spatial resolution below the diffraction limit.

Within SNOM applications, a specific technique that has been developed is a Scattering-type Scanning Near-Field Optical Microscopy (s-SNOM) which provides access to a variety of nanoscale phenomena that cannot be spectroscopically studied in situ by far-field spectroscopy due to the optical diffraction limit. s-SNOM has been a tool for studying graphene plasmons, surface phonon polaritons, phase transitions in correlative electron materials, compositions in heterogeneous materials, and chemical reactions. In s-SNOM, elastically scattered light from a sharp metallic tip operated in an atomic force microscope (AFM) over a sample surface is measured by an optical detector. Near-field interactions between the tip and sample modify the polarizability of the tip, thus affecting the elastic scattering of light. However, elastic scattering does not change the wavelength of scattered light, so the reflected or scattered photons from other parts of the AFM cantilever or a sample surface outside the tip region are also registered by the same optical detector and result in background signals, which are known as the far-field background from the background regions other than the tip-sample interaction region. To differentiate near-field signals of tip-sample interactions from far-field background, one conventional approach has been to oscillate the tip at a mechanical resonance of the AFM cantilever in a tapping mode and perform a lock-in demodulation or Fourier analysis on scattered light at a non-fundamental harmonic of the tip oscillation frequency.

However, despite wide applications and successes, tapping mode s-SNOM with lock-in detection has limitations. First, conventional s-SNOM does not provide direct information on the vertical range of tip-sample near-field interactions, as the s-SNOM signals coming out of lock-in demodulation are discrete values. Consequently, the distance dependence of tip-sample near-field interaction is convoluted in the signal generation mechanism and lost. Second, s-SNOM signals from different demodulation orders could exhibit different signal shapes and result in ambiguity in spatial patterns. Moreover, the tapping mode operation of s-SNOM cannot simultaneously perform with other AFM modalities that require a firm tip-sample contact, such as measurement of mechanical properties and electrical conductivity. Simultaneous and correlative measurement of near-field optical, mechanical, and electrical signals are not possible for tapping mode s-SNOM apparatus.

BRIEF DESCRIPTION OF THE DRAWINGS

Embodiments of the subject matter disclosed herein in accordance with the present disclosure will be described with reference to the drawings, in which:

FIGS. 3A-J are diagrams of an operation of PF-SNOM on a boron nitride nanotube and hexagonal boron nitride that reveals tip-induced phonon polariton damping, 5 nm spatial resolution and correlative mechanical electrical and near-field imaging according to an embodiment of the subject matter disclosed herein;

Note that the same numbers are used throughout the disclosure and figures to reference like components and features.

DETAILED DESCRIPTION

The subject matter of embodiments disclosed herein is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments will be described more fully hereinafter with reference to the accompanying drawings, which form a part hereof, and which show, by way of illustration, exemplary embodiments by which the systems and methods described herein may be practiced. This systems and methods may, however, be embodied in many different forms and should not be construed as limited to the embodiments set forth herein; rather, these embodiments are provided so that this disclosure will satisfy the statutory requirements and convey the scope of the subject matter to those skilled in the art.

By way of an overview, the systems and methods discussed herein may be directed to a Peak Force Scattering-Type Near-Field Optical Microscopy (PF-SNOM). Different from previous conventional approaches, the PF-SNOM technique avoids the tapping mode operation which results in subsequent information loss in lock-in detections. The novel technique discussed herein combines peak force tapping (PFT) mode and time-gated detection of near-field scattering signals with a far-field background subtraction algorithm. Compared to conventional tapping-mode based s-SNOM, PF-SNOM enables tomographic sectioning of tip-sample near-field interactions with explicit tip-sample distance, which can be extended for three-dimensional mapping of near-field responses, as well as simultaneously performing correlative near-field, mechanical, and electrical measurements with high spatial resolution well below the diffraction limit. These aspects and advantages as well as others are detailed more specifically with respect to FIGS. 1-5 as discussed below.

Figure 1:
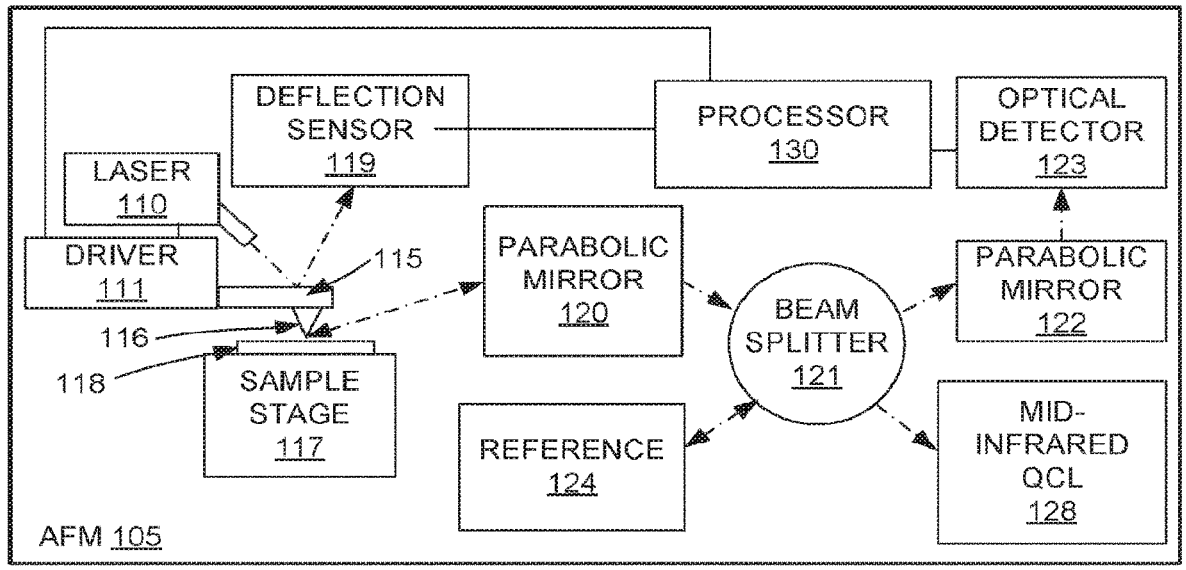
FIG. 1 is a system diagram of a Peak Force Scattering-Type Near-Field Optical Microscopy (PF-SNOM) apparatus according to an embodiment of the subject matter disclosed herein.

FIG. 1 is a system diagram of a Peak Force (e.g., non-tapping mode) Scattering-Type Near-Field Optical Microscopy (PF-SNOM) apparatus 100 according to an embodiment of the subject matter disclosed herein. In this embodiment, the PF-SNOM apparatus 100 includes an Atomic Force Microscope (AFM, 105) having a diode laser 110 (e.g., a light source) to sense the deflection of the AFM cantilever 115 through reflection on the back of the cantilever and detected by a deflection sensor 119. The apparatus is configured to allow a beam of light from a laser source, e.g. a frequency tunable mid-infrared quantum cascade laser (QCL) 128, to focus onto a sample (not shown) that may be placed on a sample stage 117 having a piezoelectric oscillator 118 disposed therein. The light source 128 may be an infrared laser suitable for producing a beam of light having a wavelength in the infrared range, although other ranges are possible in other embodiments. Further, the piezoelectric oscillator 118 disposed in the sample stage may be driven by a piezo drive stage with a frequency of between 0.1 kHz and 100.0 kHz with 4.0 kHz being a typical drive frequency. Another embodiment may include oscillating the AFM cantilever at a non-resonant frequency between 0.1 kHz and 100.0 kHz, instead of oscillating the sample. The AFM cantilever 115 driven by oscillation at a non-resonant frequency does not retain kinetic energy, in comparison to the tapping mode AFM, where the AFM cantilever 115 is driven at or near the cantilever's mechanical resonance.

The AFM 105 further includes a probe system having a driver 111 suited to maneuver a cantilever 115 having a probe tip 116 (typically covered by metals, such as gold for example) situated at the end of the cantilever 115. As with most AFMs, the cantilever is flexible and will oscillate in concert with and when placed adjacent to a piezoelectric oscillator 118 disposed in the sample stage 117. Generally speaking, the cantilever 115 will deflect up and down when influenced by the mechanical force generated by the sample on the piezoelectric actuator 118 when near or in contact with a sample set upon the sample stage 117. As will be discussed in greater detail below, the probe tip 116 may be placed adjacent to or in contact with the sample so as to measure deflections of the cantilever 115 over time using a deflection detector 119. The deflection measurement can be input to a processor 130 to determine information about the sample (e.g., an analysis circuit configured to analyze the collected data).

Further, light from a mid-infrared quantum cascade laser 128 is directed to a beam splitter 121. A mid-infrared quantum cascade laser is frequency tunable and provides selective light frequencies that matches resonances in the sample, such as vibrational transitions of molecules, polaritonic modes, or other resonant phenomena. The light source may also be another laser source that provides resonant frequencies, such as laser radiations from nonlinear optical frequency conversions as used in optical parametric oscillators for instance. One portion of the laser is split as a reference light field 124 through a beam splitter 121, the other portion from the beam splitter 121 can be focused by a first parabolic mirror 120 onto the probe tip 116. The function of the parabolic mirror 120 may be replaced by other types of light focusing optical element, such as a lens. Light is scattered from the probe tip 116. The scattered light may be reflected off of the sample. Both the direct scattered light and secondary reflection are captured by the first parabolic mirror 120.

Figure 2A:
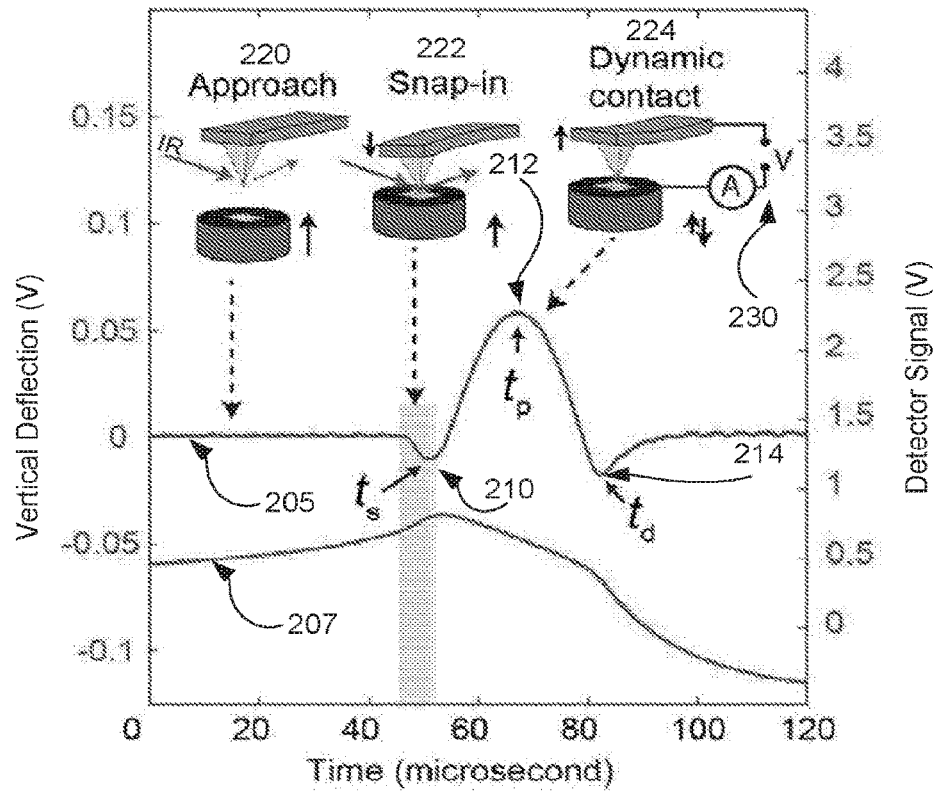
FIG. 2A is a graphical illustration of simultaneously recorded cantilever vertical deflections and infrared detector signals of the scattered light from the tip using a PF-SNOM technique according to an embodiment of the subject matter disclosed herein.

As light is reflected, it may be directed by the first parabolic mirror 120 toward the beam splitter 121. Additionally, the reference laser field 124 may also be added to the beam splitter 121 so that this signal may help detect the tip-reflected light signal through interferometric detections. To this end the beam splitter 121 may direct the light signal (the combination of the reflected signal from the sample and the reference signal 124) toward a second parabolic mirror 122 (or equivalent focusing element, such as a lens) and an optical detector 123 (for instance a Mercury Cadmium Telluride (MCT) detector) may detect it. Note that the described setup comprising a light source (laser 128), beam splitter 121, an optical reference path 124, an optical path containing the tip 116, and an optical detector 123 for interferometric detection is a typical arrangement for s-SNOM and is an asymmetric Michelson interferometer. The detected optical signal (e.g., the scattering signal) may be sent to a processor 130 and used in conjunction with the detected deflection from deflection sensor 119 of the cantilever 115 to determine aspects of the sample set upon on the sample stage 117. FIG. 2A, as discussed below, shows measurements of the optical detector signal and the cantilever vertical deflection signal over time. Again, the specifics of these determinations are discussed further below. Turning to these discussions, the operations and specifics of the apparatus shown in FIG. 1 are presented next with reference back to the components of the apparatus 100 of FIG.

FIG. 2A is a graphical illustration 200 of the simultaneously recorded vertical deflection 205 of the cantilever 115 and scattering signal 207 as detected by the optical detector 123 of the scattered light from the tip 116 using a PF-SNOM technique according to an embodiment of the subject matter disclosed herein. During operation, the cantilever 115 may be held stationary as the sample on sample stage 117 oscillates vertically with a large amplitude (for example, 300 nm) at a low frequency of several kilohertz (defined as the PF-SNOM frequency) by a piezoelectric actuator 118. The maximal cantilever deflection (e.g., peak force) may be controlled and maintained as a set point under a negative feedback loop for each oscillation cycle. As the tip 116 approaches the sample surface, the attractive intermolecular forces cause the tip 116 to jump into contact with the surface of the sample, a phenomenon known as snap-in contact, also known as jump to contact. The time at which tip-sample contact has been established, the snap-in contact time $t_s$ 210 in FIG. 2A, can be measured from the shape of the waveform of the cantilever deflection signal 205 and coincides with a deflection minimum. In this example the snap-in contact process (e.g., the darker band near $t_s$ 210) lasts from ~45-52 µs, and the snap-in contact time $t_s$ 210 is at 52 µs.

Figure 2B:
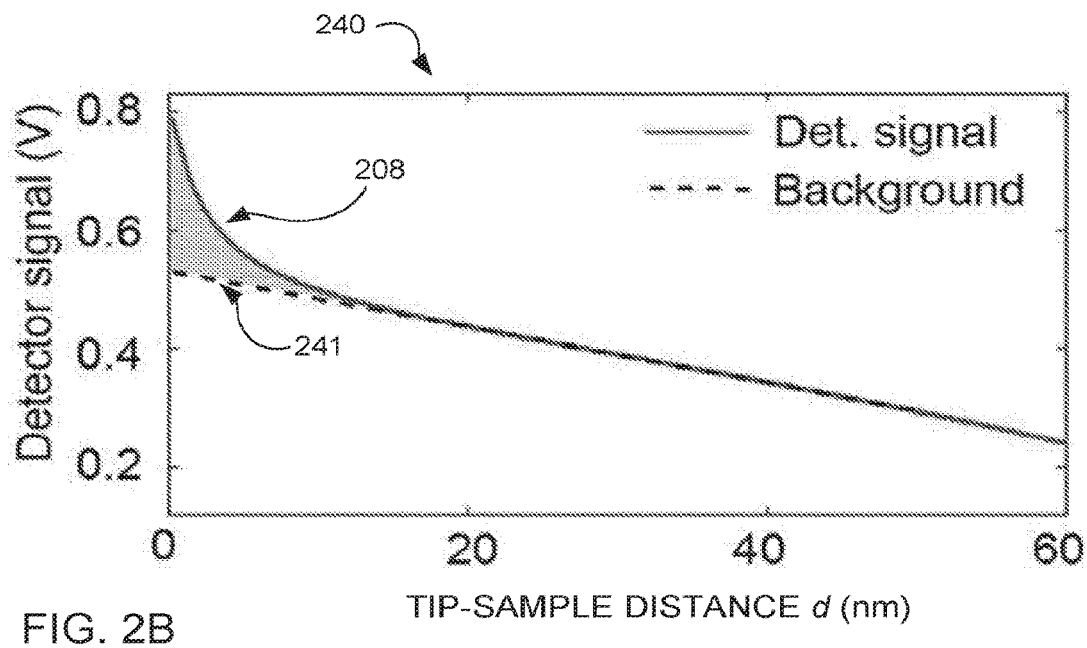
FIG. 2B is a graphical illustration of the relationship between the optical detector signal and the tip-sample distance that is derived from the two waveforms in FIG. 2A wherein a background signal remains according to an embodiment of the subject matter disclosed herein.

In FIG. 2A, the time of snap-in contact $t_s$ 210, time of maximal peak force $t_p$ 212 and tip detachment $t_d$ 214 can be determined from the plots shown as minimum and maximum in deflection. The cantilever 115 depictions at the top in FIG. 2A illustrate corresponding tip-sample configurations during three phases of a PF-SNOM cycle, from the left to the right: the tip approaching sample 220, the snap-in contact 222 and the dynamic tip-sample contact 224 that allows other AFM modalities, such as the electrical measurement 230 (as exemplified here by an applied voltage between tip and sample). Then, a plot 208 of detector signal (207 from FIG. 2A) versus tip-sample distance is derived (as shown in FIG. 2B and discussed below) given the fact that the distance can be defined as zero at the time of snap-in contact $t_s$ 210. Before the snap-in contact $t_s$ 210, the tip-sample distance can be calculated to be a positive value. After the snap-in contact the distance remains zero before the tip retracts from the sample after $t_d$ 214.

FIG. 2B is a graphical illustration 240 of the relationship between the detector signal 208 and tip-sample distance that is derived from two waveforms in FIG. 2A wherein far-field background signal remains according to an embodiment of the subject matter disclosed herein. In an embodiment, a procedure to convert the cantilever vertical deflection waveform D(t) 205 and the detector signal waveform of the scattered light S(t) 207 from FIG. 2A, where t is the time, into a function S(d) 208 as shown in FIG. 2B where d is the tip-sample distance for tomographic imaging is realized. In PFT mode, the sample piezo-stage can be vertically driven in a sinusoidal oscillation at the PFT frequency f. The vertical position of the piezo-stage $d_z$ can be written as:

$$d_z(t)=A\cos(2\pi ft+\varphi)$$

where A is the peak force amplitude and φ is the oscillation phase of the piezo-stage. The highest position of the piezo-stage also corresponds to the maximal cantilever vertical deflection (peak force set point) at the time $t_p$ in 205. At $t_p$, the phase of the piezo-stage motion φ is calculated from $2\pi ft+\varphi=0$ for maximal $d_z$ and then derived as $\varphi=-2\pi ft_p$. Therefore, the vertical position of the piezo-stage $d_z$ is:

$$d_z(t)=A\cos(2\pi f(t-t_p))$$

In this example, the time $t_p$ of maximal cantilever bending is identified from the cantilever vertical deflection signal waveform D(t) 205. With the knowledge of deflection sensitivity V of the cantilever, i.e., knowledge about the dependence of voltage or signal measured by a deflection sensor and actual tip movement in nanometer, with a typical value of several tens of nm, the tip-sample distance in time domain d(t) is then:

$$d(t)=A-d_z(t)+V\cdot D(t)$$

or, $$d(t)=A-A\cos(2\pi f(t-t_p))+V\cdot D(t)$$

Because the tip-sample distance is practically zero (consider the role of indentation in PF-SNOM negligible, as the signal is not extracted during indentation) after the snap-in contact time is and before the detachment time $t_d$, one defines d(t) into two regions, in a truncated sinusoidal shape given by:

$$d(t)=\begin{cases} A-A\cos(2\pi f(t-t_p))+V\cdot D(t), & t<t_s \text{ and } t>t_d \\ 0, & t_s \le t \le t_d \end{cases}$$

All $t_p$, $t_s$ and $t_d$ can be identified from the original D(t) curve 205. In our current PF-SNOM operation, only the light scattering signal S(t) 207 before the snap-in contact time $t_s$ is processed for each PFT cycle. Therefore, from the calculated d(t) and the synchronously measured S(t) for $t<t_s$, the relationship between the scattering signal and the tip-sample distance S(d) 208 is derived.

A clear increase of scattering signal at short tip-sample distances caused by the short-range near-field interaction is observed in FIG. 2B, together with a linearly fitted long-range far-field background 241 (dashed line). Because the PF-SNOM technique allows large amplitude oscillations of the tip-sample distance without losing feedback stability, the far-field background 241 can be accurately linearly fitted within a region where the tip is far away from the sample resulting in an accurate linear prediction of the far-field background signal for small tip-sample distances. To obtain the near-field scattering signal, this far-field background signal from background regions can then be removed from the scattered light signal because at a large tip-sample distance, the change of detector signal is responsive only to the change of far-field scattering from the cantilever shaft and the sample surface. As the wavelength of the laser is about 3 to 12 µm, the change of vertical position of the sample stage by several tens of nanometers is relatively small, so the change of far-field scattering signal can be approximated as linear with respect to the tip-sample distance. The fitted linear far-field background signal can then be extrapolated to the region of short tip-sample distance to be subtracted from the detector signal. The resulting difference (FIG. 2C) provides the relationship between the near-field signal and the tip-sample distance that enables explicit access to the vertical near-field response.

Figure 2C:
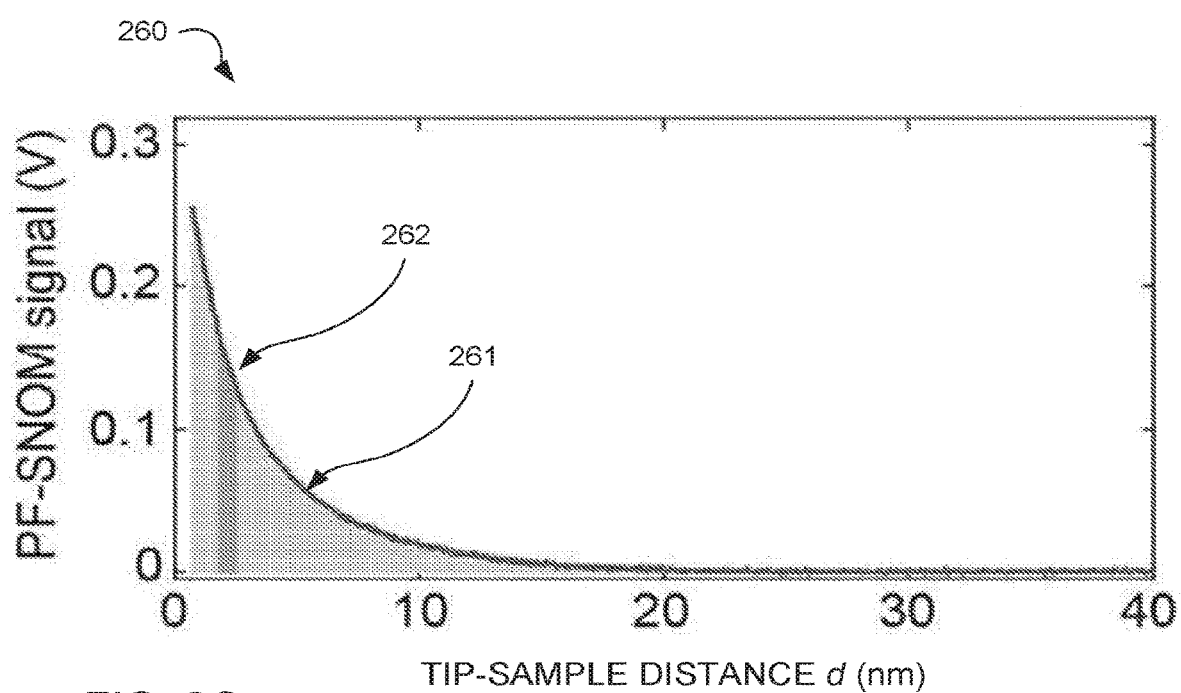
FIG. 2C is a graphical illustration of a pure near-field signal with explicit tip-sample distance dependence obtained by subtraction of the fitted linear background of FIG. 2B according to an embodiment of the subject matter disclosed herein.

FIG. 2C is a graphical illustration 260 of a pure near-field signal 261 with explicit distance dependence obtained by subtraction of the fitted linear background 241 from detector signal 208 of FIG. 2B according to an embodiment of the subject matter disclosed herein. Subtracting the approximated linear far-field background from the scattering signal provides the pure near-field response as a function of distance. In an embodiment, one procedure for removing the far-field signal includes analyzing the signal to linearly fit in the region of S(d) where the tip-sample distance d was large as shown in FIG. 2B (e.g., the right side of the plot above −20 nm). In another embodiment, a general trend fitting may be used to account for the slight deviation from a linear trend. At a large tip-sample distance, the change of detector signal is from the change of far-field scattering from the cantilever shaft and the sample surface, e.g., background regions, and it can be fitted with a linear far-field background. The resulting difference (as discussed below with respect to FIG. 2C) provides the relationship $S_{NF}(d)$ 261 between the near-field signal and the tip-sample distance that enables explicit access to the vertical near-field response.

In another embodiment, a fast background removal algorithm may be used to directly fit the far-field background signal from the scattering signal waveform in the time domain. This algorithm first extracts a short period (e.g., 120 µs) of the laser signal waveform around the time of snap-in contact $t_s$. For a short period (about 10 µs) before $t_s$, the near-field scattering light is considerably enhanced as the tip-sample distance decreases. This short period is defined as the signal region, which corresponds to a short range of tip-sample distance generally less than 5 nm. Prior to this signal region, the laser signal waveform exhibits a gradual and approximately linear increase owing to the far-field scattering background. A trend fit of the background can be performed for this region and then extrapolated to the signal region. The trend fit can be a polynomial function, e.g., a quadratic function, or other function chosen such that it overlaps substantially with the scattering signal for large tip-sample distances in the region typically above 10-20 nm and below 80-100 nm. Then, the light scattering of the signal region can be subtracted by the extrapolated far-field background to obtain the pure near-field response. The scattering signal, after the removal of far-field background, can be averaged within a defined time window prior to $t_s$ and used as the PF-SNOM signal. That means in order to improve the signal to noise ratio, e.g., for a fixed spatial position on the sample and at a fixed wavelength, the near-field response vs tip-sample distance can be averaged based on an arithmetic mean, i.e., the near-field responses are summed and divided by the number of summands. In another embodiment, averaging of the scattered light signals in the time domain can be performed before background subtraction. In that case the data can be averaged synchronously, i.e., the scattered light signals S(t) 207 in FIG. 2A and the deflection signals D(t) 205 in FIG. 2A overlap in time at a synchronization reference point which can be the snap-in contact time $t_s$ 210. After overlapping the data based on this time stamp for each PFT cycle, the near-field data or deflection signals can be averaged. From this synchronously averaged data, following above-described procedures, the scattered light signal as function of distance S(d) 208 can be obtained and after background removal the tip-sample distance dependent pure near-field signal $S_{NF}(d)$ 261 can be determined.

Figure 3A:
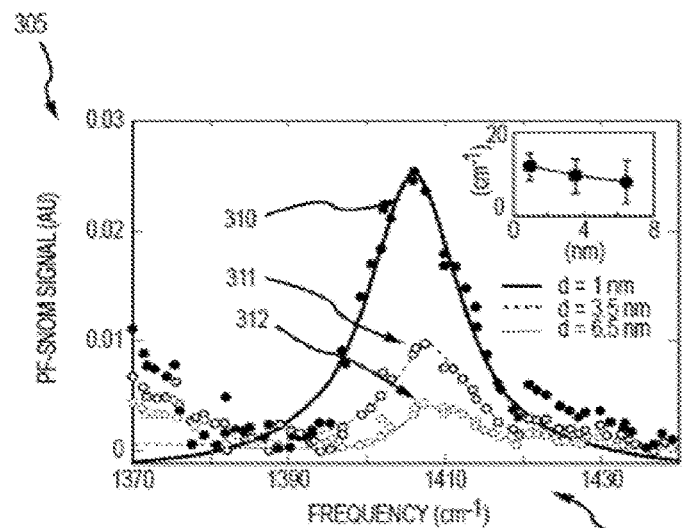
Figure 3B:
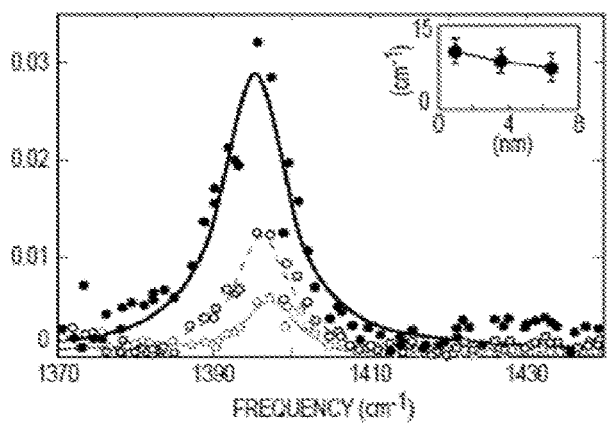
Figure 3C:
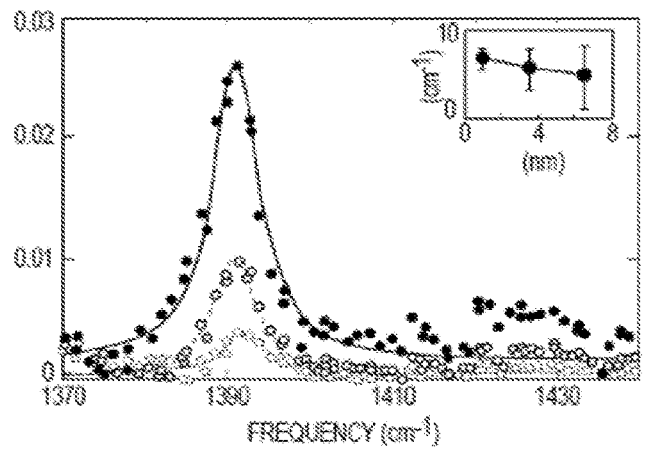

FIG. 2C shows a near-field response 260 that may be determined from the integral of PF-SNOM signal corresponding to the curve 261 at a specific tip-sample distance d. This is indicated by the dark grey bar 262. By altering the distance d of extraction of the near-filed response, corresponding near-field signals at different values of d (e.g., different gating distances) can be obtained to capture the explicit vertical near-field response between the tip and sample. As such, data may be obtained for differing distances d at different locations along a sample to produce an overall tomographic image of the sample. An example of this is shown and discussed below with respect to FIG. 3. Acquiring one PF-SNOM image of 256×256 pixels can be generated in about 30 minutes using the embodiment discussed with respect to FIG. 1. In PF-SNOM imaging, an average signal of 50 or 150 peak force tapping cycles can be used per pixel depending on the signal strength. The PF-SNOM spectra shown in FIGS. 3A-C are collected by sweeping frequencies of the tunable quantum cascade laser 128, the piezoelectric frequency was kept at 2 kHz in this example. Each point in PF-SNOM spectra may be averages over about 400 PFT cycles. Note, that conventional tapping based s-SNOM cannot provide a distance dependent near-field signal directly since its lock-In detection at different harmonics of the tapping frequencies only delivers a discrete near-field signal value, not a PF-SNOM tip-sample distance curve as 261 (assuming that no further complicated reconstruction treatment of the near-field response is involved).

Figure 2D:
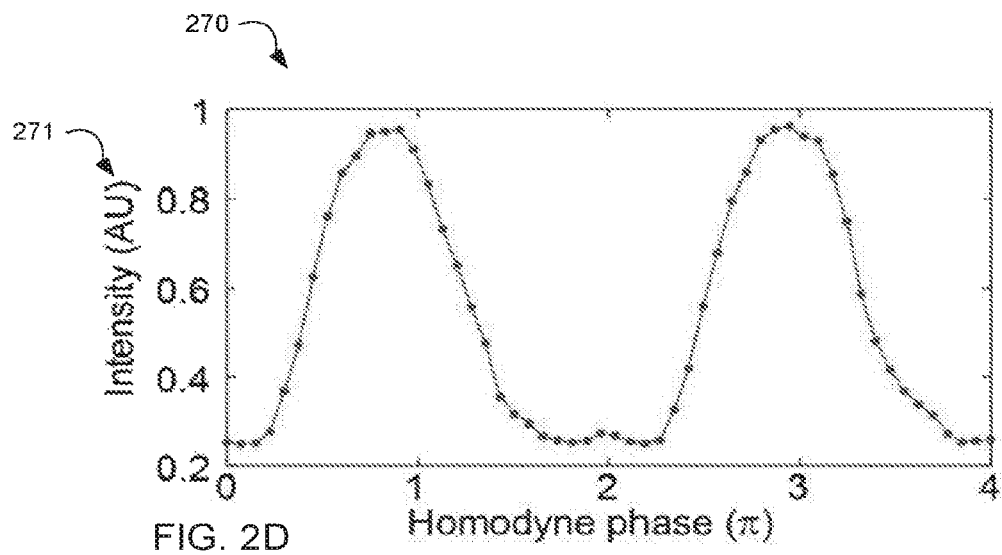
FIG. 2D is a graphical illustration of a homodyne phase dependence of PF-SNOM signals according to an embodiment of the subject matter disclosed herein.

FIG. 2D is a graphical illustration 270 of a homodyne phase dependence of PF-SNOM signals according to an embodiment of the subject matter disclosed herein. Like conventional s-SNOM, PF-SNOM signal can be interferometrically detected with a homodyne reference field (reference 124 in FIG. 1), which can be generally used to enhance the near-field signal and suppress background scattering in tapping mode s-SNOM. FIG. 2D displays the PF-SNOM signal dependence at different homodyne phases 272 by adjusting the position of the reference retroreflector. The reference retroreflector is part of the asymmetric Michelson-type interferometer usually used in s-SNOM and explained earlier with respect to FIG. 1. To repeat, in FIG. 1 a reference beam 124 is usually obtained from a QCL laser 128 by splitting the QCL output beam by a beam splitter 121. While the other part of the laser output is illuminating the parabolic mirror 120 and hence the tip 116, the reference beam 124 is reflected off a mirror or retroreflector and sent back to the beam splitter 121 to overlap with the tip-scattered light on the optical detector 123 after focusing by a focusing element 122. At the optical detector the tip-scattered light and the reference light interfere and the registered signal intensity depends on the relative optical path length between the reference path and tip-scattering path, i.e., the relative phase of the light fields. The intensity 271 in FIG. 2D is the optical detector signal when adjusting the homodyne phase 272, i.e., the relative optical path length between tip-scattered light path and reference path. It is usually changed by altering the position of the retroreflector in the reference path leading to clear signal minima and maxima in FIG. 2D from interference of the light fields. In another embodiment the optical path length of the tip-scattering path is altered relative to a stationary reference path. As in tapping mode s-SNOM, the phase-sensitive PF-SNOM can also be used to compute amplitude and phase of the near-field signal, from which the absorption and reflection of the sample may be extracted.

Figure 2E:
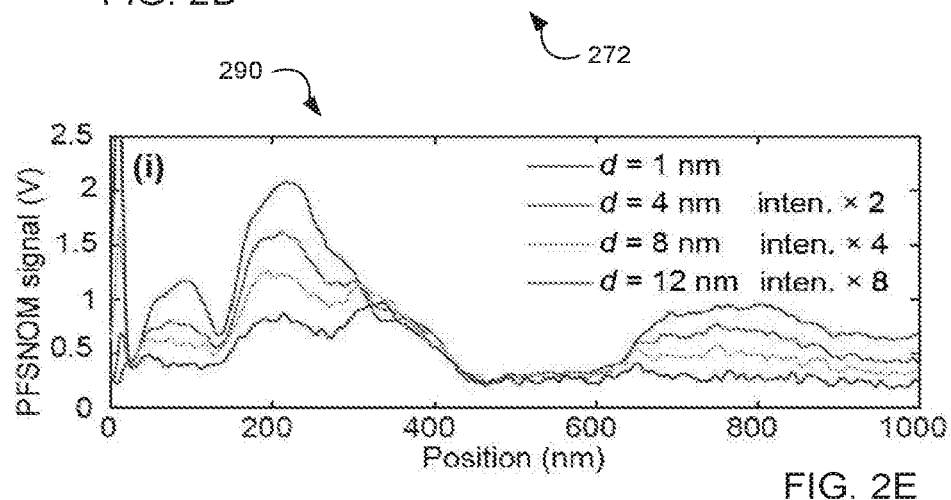
FIG. 2E is a graphical illustration of different PF-SNOM signal at differing tip-sample distances with respect to one wavelength (1405 cm$^{-1}$) for a 1000 nm long line scan across a boron nitride nanotube according to an embodiment of the subject matter disclosed herein.
Figure 2F:
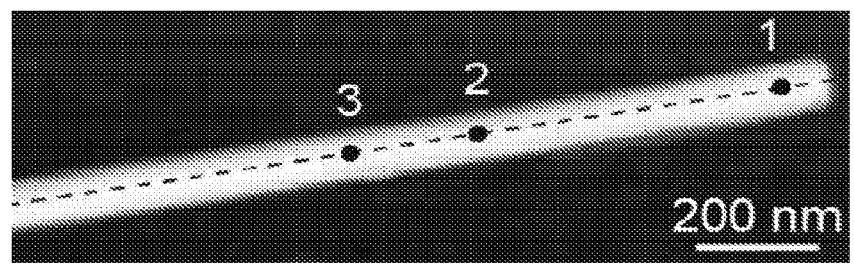
FIG. 2F is a graphical illustration of a boron nitride nanotube over which the line scan of FIG. 2E has been performed according to an embodiment of the subject matter disclosed herein.

FIG. 2E is a graphical illustration 290 of different PF-SNOM signal at different tip-sample distances with respect to one wavelength (1405 cm$^{-1}$) for a 1000-nm long line scan along the long axis of a Boron Nitride Nanotube (BNNT) according to an embodiment of the subject matter disclosed herein. The topography of the BNNT (e.g., a three-dimensional representation) is shown in FIG. 2F and the line scan zero-position starts at the BNNT terminal at the right in the figure (close to marker "1"). In this example plot, extracted profiles of the PF-SNOM responses from the top surface of a Boron Nitride Nanotube (BNNT) sample are shown for different tip-sample distances d. (For the convenience of comparison, profiles from d=4, 8 and 12 nm are magnified by factors of 2, 4, and 8 respectively). As such, image plots for different distances d (e.g., two-dimensional representations) may be extracted from this and other related plot across a 256×256 pixel area (or other suitable area). One can see as d decreases from 12 nm to 1 nm, the near-field profiles along the top surface of the BNNT nanotube show not only overall larger near-field signal as expected, but also more fraction of near-field intensities closer to the terminal of the nanotube (close to position "1" in FIG. 2F), which indicates stronger tip-sample interactions are available at the terminal of the BNNT when tip gets closer to the surface. By fitting the vertical decay behavior of near-field responses with an empirical exponential decay function $S(d)=A_{NF} \, e^{(-d/b)}$, where S(d) is the near-field response that depends on tip-sample distance d, and $A_{NF}$ and b are fitting coefficients representing total amplitude of near-field response and vertical decay range, we can obtain two new representations of near-field signals based on the total near-field amplitude $A_{NF}$ and the tip-sample characteristic 1/e decay range b. The direct acquisition of tip-sample interaction range is a unique advantage of the PF-SNOM method, while tapping mode s-SNOM with individual lock-in demodulation lacks such capability, if no further reconstruction treatment of near-field response is involved.

Another advantage of PF-SNOM over conventional tapping mode s-SNOM is an ability to directly acquire near-field scattering signals with the vertical tip-sample distance dependence across different distances (e.g., gated sampling). This ability allows collections of tomographic near-field images, which can reveal more subtlety of tip-sample interactions than a conventional s-SNOM technique. As will be discussed below with respect to FIGS. 3A-F, linewidth broadening and resonant frequency shift of Phonon Polariton (PhP) resonances in a boron nitride material are observed by PF-SNOM within a tip-sample distance range of less than 10 nm, a range that is very difficult for tapping mode s-SNOM to distinguish due to necessary oscillations of the tip with amplitudes of typically 25-60 nm and subsequent convoluted signal generations. Because direct and quantitative elastic scattering signals can be obtained by PF-SNOM, one can determine features of tip-induced relaxation of PhPs.

As the PF-SNOM signal is directly proportional to the near-field signal, numerical modeling of PF-SNOM signals requires much less computational complexity than tapping mode s-SNOM, where additional steps are needed to account for tip oscillations and lock-in demodulations to reproduce the s-SNOM signal. Although the approach of reconstruction s-SNOM with Fourier synthesis has been used with tapping mode s-SNOM to vertically reconstruct tip-sample near-field responses, the bandwidth of reconstruction s-SNOM is limited by the number of harmonic demodulations in the Fourier synthesis and the oscillation amplitude of the tip. For example, even using a total of 18 harmonic demodulations, vertical resolution in the reconstruction s-SNOM is only 8.3 nm for a 150-nm tip oscillation amplitude. A vertical resolution of 8.3 nm is unable to capture the features of near-field interactions in a short range below 10 nm as is capable with the presently disclosed system and technique, let alone the ability to simultaneously register 18 harmonics, without expensive high-end multi-channel lock-in amplifiers. In comparison, vertical resolution of PF-SNOM is related to bandwidth of the infrared detector, PFT amplitude, and PFT frequency, all of which can be easily tuned or satisfied to enhance vertical resolution. In our PF-SNOM apparatus, the vertical resolution is estimated to be 0.12 nm, thus PF-SNOM is far more accurate for resolving near fields in the vertical direction than existing tapping mode s-SNOM techniques. Large numbers of tomographic images within a large range of tip-sample distances can be directly obtained by PF-SNOM. This advantage can be used to reveal three-dimensional near-field distribution of plasmonic nano-antennas. Furthermore, because the spatial resolution is determined by the lateral confinement of field enhancement, PF-SNOM with high vertical precision allows achieving the tightest field confinement in the gap mode by acquisition at short tip-sample distances, and provides superior lateral spatial resolution of 5 nm, as shown in the signal cross profile of FIG. 3I. over that of 10-20 nm of tapping mode s-SNOM, where the size of the field confinement changes as the tip is vertically oscillating, leading to a compromised lateral field confinement.

Tomographic near-field images of BNNT and spectra of SiC by PF-SNOM have implications for scattering-type near-field optical microscopy. s-SNOM is widely used in the characterization of near-field responses of polaritonic materials. It has been rarely a concern that the AFM tip can change near-field behaviors of samples. In PF-SNOM where near-field responses at short tip-sample distances are directly extracted, changes of the spectral behaviors of PhPs are clearly observed. The metallic tip is not just a scattering object for probing the near field, but also acts as a damper at short tip-sample distance. This means the spatial patterns obtained by scattering-type near-field optical microscopy in general should be treated with caution, as the measuring tip can affect the near-field responses that are being measured. The measurement made by PF-SNOM, because of the ability to acquire responses at different tip-sample distances, is particularly useful in deciphering actual near-field responses.

As noted earlier peak force tapping allows not only topographic imaging but also nano-mechanical mapping of sample properties such as modulus or adhesion as well as electrical imaging, for instance to determine the nanoscale conductivity of a sample. In PF-SNOM this can be combined with near-field mapping to obtain correlative images of many sample properties. The ability to acquire vertical near-field responses as well as the compatibility with simultaneous mechanical and electrical measurement of PF-SNOM stem from real-time measurement of near-field scattering signals, which is enabled by a well-defined tip-sample contact in the PFT mode. As the cantilever of AFM tip is held stationary, except being pushed upward during the dynamic contact, the kinetic energy stored in the cantilever is almost zero. Consequently, the response of the cantilever to intermolecular forces between tip and sample is highly sensitive, thus giving out a well-defined snap-in contact time is for the zero tip-sample distance reference point. In comparison, the cantilever in tapping mode AFM is externally driven to oscillate. The intermolecular force between tip and sample leads to a considerable shift of the oscillation phase of the cantilever from the external driving oscillation. While the phase shift in tapping mode AFM is informational and used as phase imaging mode, the large phase shift creates a problem to determine the timing of momentary tip-sample contact for possible utilization for other AFM modalities. The shifting oscillatory phase in tapping mode AFM also renders a time-gated detection scheme difficult in contrast to PF-SNOM where the tip-sample distance as function of time can be precisely determined.

In tapping mode AFM, the repulsive force, attractive force, and especially adhesive force between the tip and sample lead to nonlinear dynamic behaviors of the cantilever oscillations, which will also manifest even in high-order lock-in demodulations via anharmonic far-field scattering. In contrast, the PF-SNOM directly measures the scattering signal from the approaching side of the PFT cycle, where the adhesion between the tip and sample after contact does not have any effect, thus avoiding possible mechanical distortions from sticky surfaces. In this regard, PF-SNOM is more adaptive to rough and sticky samples than tapping mode s-SNOM. Note that in another embodiment, the retract curve can be used to obtain the near-field information, i.e. the scattering signal is analyzed when the tip detaches from the surface after point to in FIG. 2A of curve 205. This is possible when the possible mechanical distortions are small or can be corrected for.

PF-SNOM is complementary to the existing peak force infrared (PFIR) microscopy that measures the laser-induced photo-thermal expansion in the peak force tapping mode. PF-SNOM optically detects the near-field scattering signal from the tip and sample that is determined by the tip-sample polarizability and propagating surface waves; whereas PFIR performs mechanical detection on the result of local optical absorption and subsequent dissipation of energy into heat. PF-SNOM inherits the advantages of s-SNOM in the measurement of rigid and polaritonic materials with spatial contrast originating from the difference in dielectric functions, in comparison to PFIR microscopy that is suitable for soft matters with large photo-thermal expansion coefficients.

PF-SNOM enables simultaneous mechanical, electrical and optical near-field characterization of samples. Three complimentary aspects of properties of the sample obtained in one measurement by PF-SNOM will be very useful in investigations of nanoscale behaviors of functional materials, such as the metal-insulator transitions of correlated electron materials, and nanoscale optical mechanical structures and devices. The versatile compatibility makes PF-SNOM a more complete scattering-type near-field optical microscopic platform for many applications.

An example for the valuable information that is accessible with the tip-sample distance dependent near-field spectroscopy of PF-SNOM is given in FIG. 3. FIGS. 3A-I illustrate an example set of data analyzing resonant peak positions and spectral peak widths of the phonon-polariton of a boron nitride nanotube (BNNT) and their tip-sample distance dependence according to an embodiment of the subject matter disclosed herein. At three different spatial positions on the same BNNT nanotube (marked by 1, 2, 3, in FIG. 2F corresponding to FIGS. 3A-C) the PF-SNOM signal for three different tip-sample distances d is measured as a function of laser wavelength. For example, FIG. 3A shows scattering near-field responses (the y-axis 305) for a first position on the BNNT for multiple tip-sample distances (e.g., 1 nm 310, 3.5 nm 311, and 6.5 nm 312, in this example) across a plurality of wavelengths of the light source (the x-axis 306). Lorentzian fittings on the central peak regions are shown as solid curves of corresponding sets of distance groups. The insets show the transition of full-width at half-maximum (FWHM) linewidths of the fitted resonant peak $\omega_p$ at three different values of d. As d decreases, an increase of the linewidth of $\omega_p$ is observed.

FIGS. 3B and 3C show similar plots for different positions with respect to the sample. Thus, one could gather data corresponding to a 256×256 matrix of positions (e.g., pixels) to eventually generate a tomographic image based on the PF-SNOM data gathered. FIG. 3D contains the fit parameters for the Lorentzian fits of FIGS. 3A-C. Simulated spectra based on the image dipole model at d=1, 3.5, and 6.5 nm with a dielectric function of boron nitride (BN) are presented in FIG. 3E. FIG. 3E illustrates the emergence of a shift 320 of $\omega_p$ at different values of d and is shown by the slanted vertical line. A similar shift can be seen in the experimental data summarized in FIG. 3D. The accurate measurement of the plasmonic resonance and shift due to the tip-sample interaction provides a more accurate estimation of the resonance of the nanostructure, which improves the evaluation of the spectroscopic property of chemical sensors based on polaritonic materials.

Figure 3G:
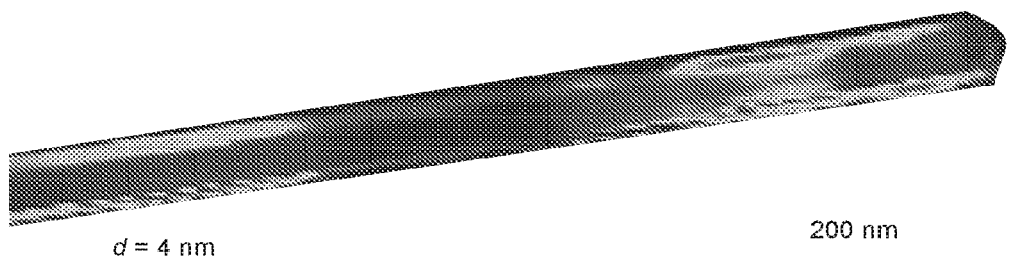

FIGS. 3F-G is an illustration of a tomographic image that can be created from the data gathered by the PF-SNOM technique according to an embodiment of the subject matter disclosed herein. In this view, a single set of data corresponding to near-field responses associated with a single tip-sample distance (e.g., d=1 nm in FIG. 3F and d=4 nm in FIG. 3G) for a single wavelength of light from the light source (e.g., 1390 cm$^{-1}$, in this example). As discussed above, surface phonon polaritons (PhPs) are surface electromagnetic modes formed by collective oscillations of optical phonons and the electric field bound to the surface. Polar materials such as silicon carbide (SiC) and boron nitride (BN) are known to support surface PhPs. PF-SNOM is capable of probing PhPs on a sample surface in both lateral and vertical directions. FIGS. 3A-I show the data gathering, measurement, and image construction of one example of a boron nitride nanotube (BNNT) using PF-SNOM microscopy.

Figure 3H:
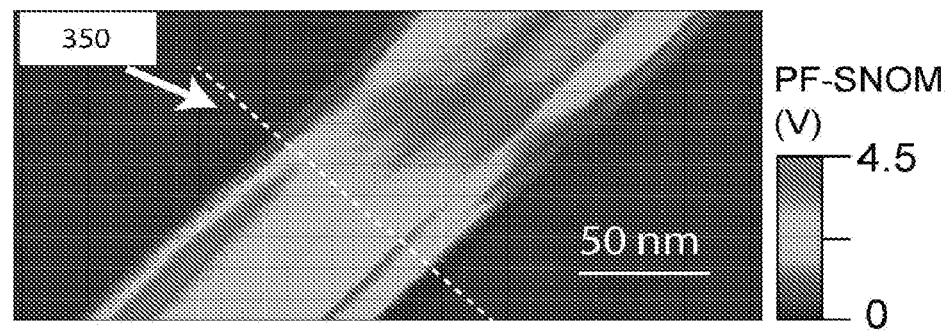
Figure 3I:
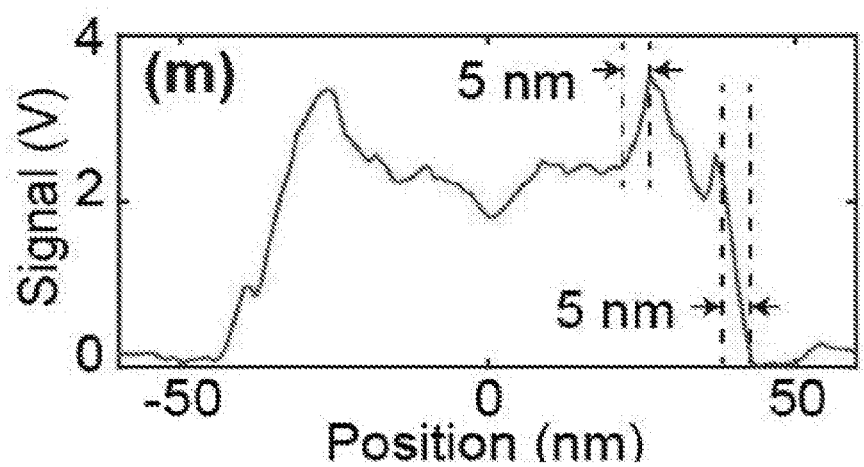

Spatial resolution of PF-SNOM can be estimated from the edge of the BNNT. FIG. 3H shows a zoomed PF-SNOM image taken at d=1 nm. FIG. 3I displays a profile section of PF-SNOM image along the white line 350 in FIG. 3H, where a spatial resolution of 5 nm is obtained. In comparison, the metallic tip used in this example is estimated to have a radius of 30 nm. The great improvement of the spatial resolution of PF-SNOM better than the tip radius is due to the gap-mode enhancement at the short tip-sample distance of 1 nm formed by highly non-uniform spatial distribution of the light field, which is tightly bound in lateral dimension in a range much less than the radius of the tip.

The spectral response of BNNT also exhibits dependence on the tip-sample distance d. FIGS. 3A-C shows measured scattering spectra from three locations on the BNNT by PF-SNOM at three different values of d at 1, 3.5 and 6.5 nm with frequencies from 1370 cm$^{-1}$ to 1440 cm$^{-1}$. Fitting parameters for the PF-SNOM spectra from three locations and three tip-sample distances are tabulated in FIG. 3D, in which one can find that as the probing locations get further away from the terminal of the nanotube (from location 1 to 3 in FIG. 2F), the central resonant frequency $\omega_p$ of the PhPs redshifts and its peak linewidth narrows (in terms of full-width at half-maximum (FWHM)). This is likely a result from the interference between tip-launched PhPs and terminal-reflected PhPs. PhPs stimulated by lower frequencies have longer polariton wavelengths and lower losses. Such PhPs with lower frequencies travel further and thus are more prominent at locations further away from the terminal. On the other hand, as the lower loss of polaritons corresponds to a longer lifetime, the linewidth of the resonant peak $\omega_p$ is also consequently narrower.

There are two special features involving the tip-sample distance in FIG. 3D that can only be revealed by PF-SNOM. First, at the same location on the BNNT, the resonant frequency $\omega_p$ of PhPs redshifts by a small amount when the tip-sample distance d decreases. This shift can be qualitatively interpreted by the image dipole model based on the dielectric function of boron nitride. FIG. 3E shows the simulated relationship between maxima of polaritonic resonance spectra and tip-sample distance d according to the image dipole model with a 30-nm radius Au-coated tip. A small shift of 1 cm$^{-1}$ of $\omega_p$ is observed in FIG. 3E with tip-sample distance d decreased from 6.5 to 1 nm. Because the spatial frequency of PhPs depends on the frequency of the light source, the shift of $\omega_p$ suggests that spatial patterns of PhPs should change at different distances of measurement in high dispersion region of PhPs.

The second feature from FIG. 3D is that at the same probing location, the linewidth of $\omega_p$ broadens when the tip-sample distance decreases, indicating that the lifetime of the BN NT PhPs decreases as the tip gets closer to the surface. The reduction of the lifetime is possibly due to more relaxation channels formed by the presence of highly confined gap mode, which will considerably increase optical density of states between the tip apex and the surface of the BNNT. Consequently, the relaxation of PhPs is favored and the linewidth of the resonances broadens, despite that the strong field enhancement of gap mode will excite more PhPs. This enhanced relaxation effect is conceptually similar to the Purcell effect of fluorophore coupled to a resonant cavity and tip-enhanced relaxation.

With the above-described atomic force microscopy system, several advantages are realized by this novel PF-SNOM method and system. Specifically, PF-SNOM allows a fast measurement of three-dimensional near-field responses. PF-SNOM allows measurement of a plurality of near-field signals from a plurality of tip-sample distance measurements. Consequently, a three-dimensional near-field response cube (e.g., a three-dimensional plot) can be constructed by stacking PF-SNOM images at different tip-sample distances into a data cube, or by assembling near-field responses at different tip-sample distances from a set of two-dimensional lateral positions. In contrast, current tapping mode s-SNOM does not allow this operation with sufficient speed and only after applying highly complex algorithms. As such, three-dimensional plots of data using the conventional s-SNOM systems and methods are not viable.

In another advantage over conventional solutions, the ability to measure the near-field signal at or below 2 nm tip-sample distance leads to an increase of spatial resolution. In PF-SNOM, the tip-sample distance is accessible when the tip is very close to the sample (e.g., less than 2 nm). The near-field signal with tip-sample distances below 2 nm can be easily obtained. The lowest possible tip-sample distance is only limited by the detector response time. A measurement at a tip-sample distance of 1 nm is demonstrated in the embodiments discussed above.

In contrast, in the conventional tapping mode s-SNOM, the AFM tip oscillation amplitude cannot be arbitrarily small, because conventional tapping mode AFM requires at least a medium oscillation amplitude for the AFM topography feedback. A typical conventional tapping mode AFM tip oscillation amplitude is 25 to 60 nm. The signal from tapping mode s-SNOM does not provide access to near-field signals between the tip and sample at the lower tip-sample distance range. In contrast, PF-SNOM near-field images at a close tip-sample distance of 1 nm are demonstrated herein and provide a high spatial resolution.

In another advantage, PF-SNOM accesses the gap-mode enhancement to amplify near-field signals and improve signal strength. PF-SNOM allows routine access to the gap-mode enhancement. That is, when a metallic tip is close to a conductor or, in general, a sample with a negative real part of the dielectric function, the electric field is strongly enhanced between the gap of the tip and the sample. Gap-mode enhancement leads to amplification of the electric field and leads to stronger near-field signals. PF-SNOM allows measurement of the near-field scattering signals when the tip-sample is very close, e.g., less than 2 nm. The close range enables collection of near-field signal from the gap-mode enhancement, without mixing with near-field scattering signal that lacks gap-mode enhancement. The access of gap-mode enhancement highly localizes the excitation field and also improves the spatial resolution of PF-SNOM to about 5 nm, with an AFM tip of ~30 nm radius. In contrast, the conventional tapping mode s-SNOM provides a spatial resolution of over 10 nm.

In another advantage, PF-SNOM uses synchronized data acquisition that allows the signal-to-noise ratio improvement through synchronously averaging multiple tip-sample approaches/retracts across several events. In PF-SNOM, the data acquisition is synchronized with the change of the tip-sample distance to a moment right before the tip-sample contact. The synchronized detection, also known as gated detection, enables averaging of near-field signals to improve the signal-to-noise ratio.

In another advantage over conventional s-SNOM, the PF-SNOM technique utilizes the peak force tapping mode as opposed to a conventional tapping mode. In peak force tapping mode, the distance between the tip and sample is predictable as the AFM cantilever does not store kinetic energies. Differently, in the conventional tapping mode s-SNOM, the cantilever is oscillating at one of its resonant frequencies. Kinetic energy is stored in the AFM cantilever motions. The intermolecular force interaction between the tip and sample leads to an unpredictable shift of the oscillation phase in tapping mode AFM. The shift of the oscillation phase of the tapping mode AFM means that the moment when the tip and sample are closest to each other becomes unpredictable and is dependent upon the sample surface. This results in the time synchronized signal acquisition being difficult as the tip-sample distance cannot be predicted without the knowledge of the underlying sample contours that is being measured.

PF-SNOM does not suffer from this effect. Rather, PF-SNOM considers the deviation of the tip-sample distance due to the intermolecular force between the AFM tip and sample. The intermolecular force at short tip-sample distance range leads to the changes in the tip-sample distance during approaching and retracting the cantilevers. In PF-SNOM, the cantilever deflection is dynamically measured simultaneously with the near-field signal. The cantilever deflection is used to provide corrections to the readout of the tip-sample distance. In contrast, the conventional tapping mode s-SNOM cannot correct for the real-time tip-sample distance perturbation by using a lock-in amplifier.

Figure 3J:
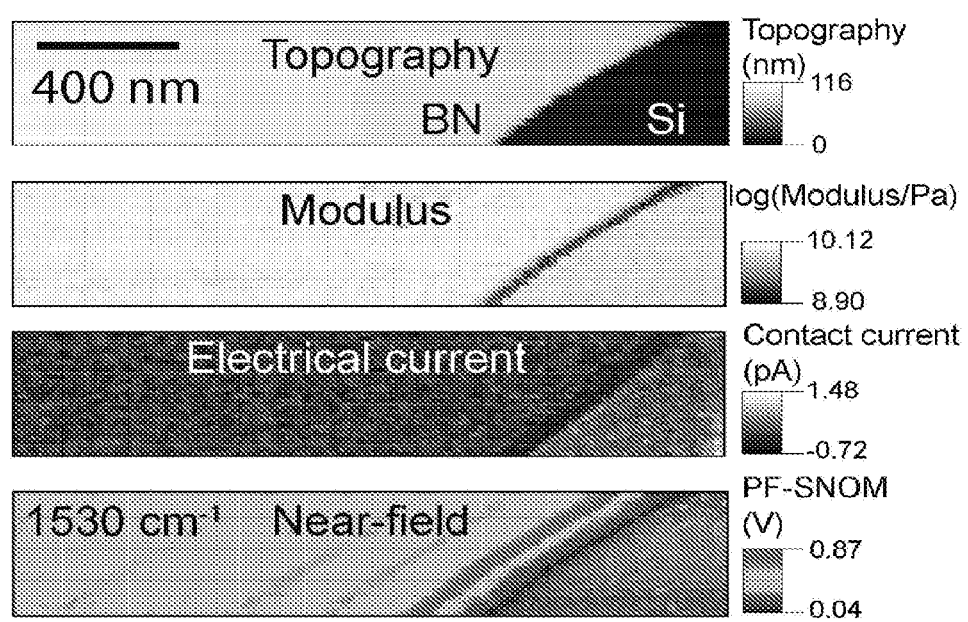

In another advantage, PF-SNOM enables simultaneous measurement of the near-field signal, mechanical responses, and electric signal in one AFM operation mode without switching. In conventional s-SNOM the joint measurement of near-field and mechanical mapping is accomplished sequentially. That is, the mechanical information may be determined using peak-force tapping mode, but the near-field imaging collected by conventional s-SNOM in the conventional tapping mode. The joint measurement is time-consuming. In PF-SNOM, both the near-field measurement and the mechanical measurement are accomplished in the peak force tapping mode in one measurement. Additionally, the electrical conductivity measurement can also be accomplished in one operation mode, together with near-field imaging and mechanical mapping. FIG. 3J illustrates the correlative measurement of sample topography, mechanical modulus, contact current, and near-field responses of a hexagonal boron nitride flake on semiconductor silicon substrate. The higher modulus and lower electrical conductivity of hexagonal boron nitride is revealed, in comparison to the silicon substrate. The near-field responses of phonon polaritons in hexagonal boron nitride is revealed at the infrared illumination frequency of 1530 cm$^{-1}$.

In yet another advantage, PF-SNOM provides a higher signal-to-noise ratio per unit tip-sample oscillation cycle than conventional tapping-mode s-SNOM. In PF-SNOM, the near-field signals can be recovered as the integration of near-field signal within a range of tip-sample distances. This leads to more data points than the single-valued lock-in demodulation. Consequently, a smaller number of tip oscillation cycles is needed as compared to conventional tapping-mode s-SNOM.

In yet another advantage, peak-force tapping-mode, on which PF-SNOM is based on, is widely applicable to a range of samples. The tapping-mode AFM simply provides poor or unstable feedback on a sticky or rough sample surface. Consequently, tapping-mode s-SNOM cannot be applied to those sample surfaces. Peak-force tapping-mode AFM is not as limited with regard to the stickiness or roughness of the sample surface. Thus, PF-SNOM inherits the wide applicability of the peak-force tapping-mode and can be applied to non-ideal sample surfaces.

Figure 4:
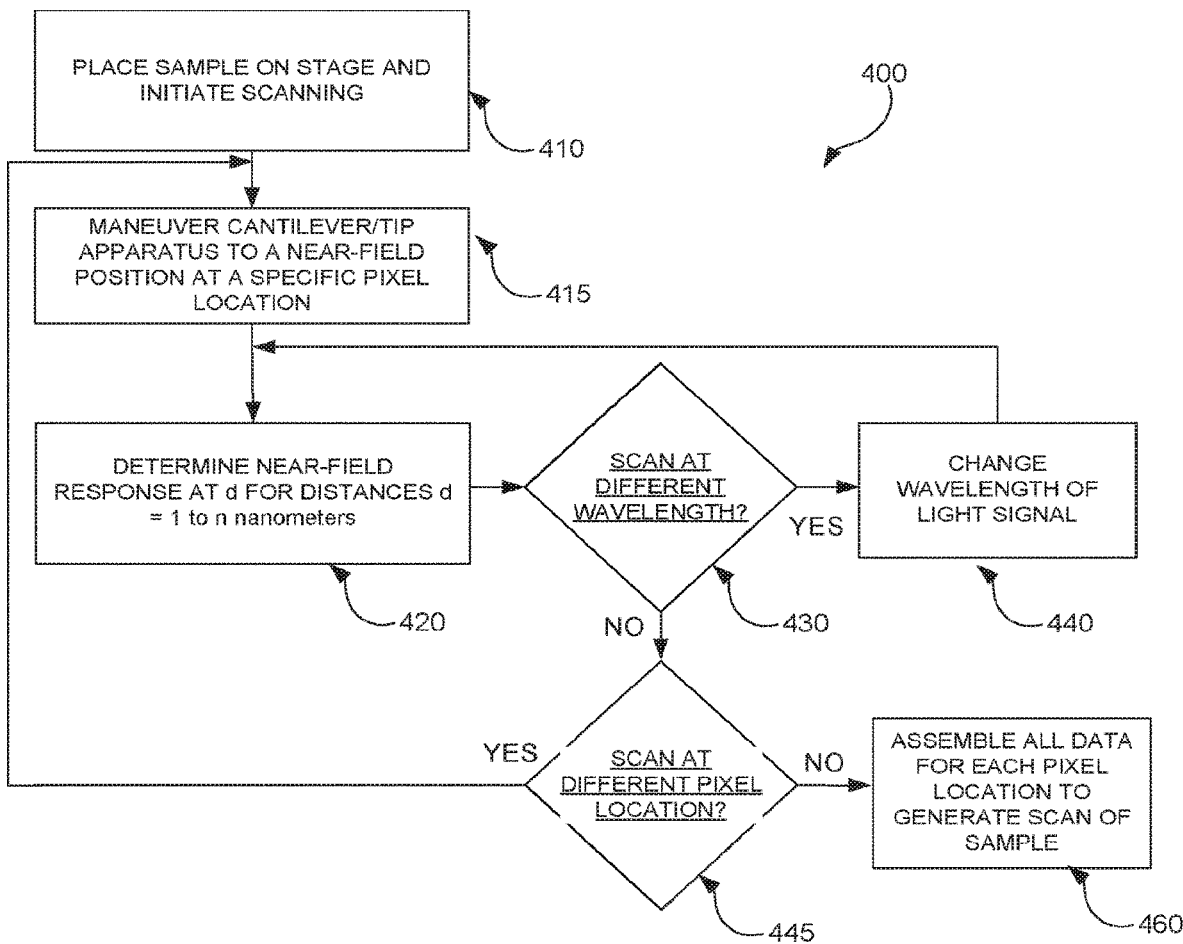
FIG. 4 is a method flow chart illustrating a method suited to implement a PF-SNOM technique for AFM microscopy in accordance with an embodiment of the subject matter disclosed herein.

FIG. 4 is a method flow chart 400 illustrating a method suited to implement a PF-SNOM technique for AFM microscopy in accordance with an embodiment of the subject matter disclosed herein. The method may begin at step 410 when a sample may be placed on a sample stage of an AFM and a PF-SNOM scan cycle may be initiated. In one embodiment, as discussed above, the sample may be BNNT. Once the PF-SNOM process is initiated, a piezo drive stage may generate a signal configured to cause motion in a sample stage that comprises a cyclical variation in a vertical distance between the approaching tip/cantilever apparatus and the sample. The tip may then be maneuvered toward the sample for a specific location (e.g., a pixel location) at step 415. This will invoke an interaction between the tip and the sample comprising vertical deflections of the cantilever resulting in dynamic contact of the tip with the sample at an oscillation frequency of the piezoelectric material in the sample stage. As discussed above, this frequency is typically between 0.1 kHz and 100.0 kHz.

As the tip interacts with the sample, the method may then determine near field responses for various distances (e.g., gated discrete distance responses) at step 420. This is accomplished by detecting vertical deflection of the cantilever to determine a plurality of tip-sample distances corresponding to tip contact with the sample and cantilever deflection over a time period. That is, snap-in contact can be determined at a specific time interval as can maximum deflections away from a rest position. With such determinations, one may determine a plurality of near-field scattering responses from light focused on the sample at the tip-contact region of the sample. Further, any background signal may be removed from the response signal initially determining a representative background signal when the tip is not sufficiently close to the sample to cause short-range near-field interaction during cyclical variation. Then one may approximate a linear or nonlinear response corresponding to the determined background signal and removing the approximated linear or nonlinear response from the plurality of near-field scattering responses once the sample causes deflections in the cantilever through invoked interaction.

These scans can be accomplished at different wavelengths. Thus, at step 430, a query regarding scanning at another frequency is posed. If additional frequencies are to be scanned for this pixel position, the method returns to step 420 after adjusting the wavelength of the light source, at step 440, and the scattering near-field response is recorded again with the new wavelength. If there are no more wavelengths in which to collect response data from the sample at this location, the method moves to query step 445 to determine if more pixel locations are to be analyzed. If yes, the method reverts back to step 415 where the tip is maneuvered to the new pixel location. If there are no more pixel locations at query step 445, the method moves to step 460 where all collected data may be used to generate one or more tomographic images of the underlaying sample. This may be accomplished by correlating the plurality of near-field scattering responses with the plurality of tip-sample distances for each sample location to generate a near-field response data mapping of the sample. The correlating function may further include correlating sets of near-field scattering responses from the plurality of near-field scattering responses with tip-sample distances for each sample location wherein each set is correlated with an equivalent tip-sample distance of d=1 to n nanometers at each sample location. Further yet, the correlations may be accomplished across the different wavelengths used to analyze the sample. The schematic of FIG. 4 describes the different use-cases such as near-field mapping/imaging at a constant wavelength, near-field point spectroscopy over a variety of wavelengths at a single spatial location, and near-field spectroscopy over a variety of wavelengths for different spatial locations (e.g. for a linescan or hyperspectral map of 256×256 pixels where a full spectrum is recorded at each pixel).

Conventional s-SNOM based on tapping mode AFM operation requires a continuous-wave (cw) or quasi-cw light source, i.e. if it is a pulsed light source then the repetition rate needs to be sufficiently high, usually in the 10s of MHz range, e.g. 80 MHz. The reason for this is that the near-field signal is obtained from demodulation of the tip-scattered signal at higher harmonics (typically $2^{nd}$-$4^{th}$ harmonic) of the tip oscillation frequency (typically 200-400 kHz). A light source repetition rate in the ~100 kHz to ~1 MHz range would be often below the required Nyquist sampling rate to reveal the higher harmonics of the tip oscillation frequency, as a result, demodulation with a Lock-In amplifier as typically done in s-SNOM would not work satisfactorily. More complicated signal reconstruction is necessary for conventional s-SNOM to work with low repetition rate lasers. PF-SNOM has less stringent requirements on the light source. Since the scattering signal in PF-SNOM is typically extracted only over several tens of microseconds before the tip-sample contact is established around the snap-in contact time is (see FIGS. 2A and B), it is sufficient to illuminate the sample only during that time interval. That means in an extreme case the laser only needs to emit during-50 us within a PFT cycle that typically lasts 500 us for a 2 kHz PFT frequency. Such a reduced duty cycle of 10% in this example may be beneficial to prevent excessive sample heating for sensitive samples. Furthermore, pulsing of the light source in the kHz range up to MHz range still allows to extract PF-SNOM data. Since the tip position in the PFT cycle is known and well-defined at each time, the optical detector signal can be referenced to a specific tip position. For low laser repetition rates of the order of the PFT cycle frequency, e.g. 2 kHz, only very few pulses per cycle, e.g. only 1, are registered together with the tip position. Collecting data over many PFT cycles will eventually result in a sufficient number of data points for the scattering signal vs tip sample distances S(d) so that a curve 208 in FIG. 2B consisting of discrete data points can be interpolated and analyzed. The laser repetition rate and PFT frequency may be synchronized with respect to each other so that for instance a scattering signal at a certain fix tip-sample distance, e.g. d=1 nm, for every PFT cycle can be obtained. In this specific case of synchronized PFT cycle and laser repetition rate, once the shape of the background signal has been established, the PF-SNOM signal minus the background signal can be deduced from just measuring a single optical detector signal within a single PFT cycle. That means determining the whole curve of tip-sample distance dependent scattering signal S(d) is not necessary and a pulsed low kHz laser can be used. But it requires knowledge of the background signal which can be obtained from measuring the scattering signal vs tip sample distances (curve 208 in FIG. 2B) for instance by shifting the relative timing between the synchronized laser pulses and PFT cycles, or by operating unsynchronized, to collect sufficiently many data points to interpolate and reconstruct a curve 208 in FIG. 2B. Subsequent linear or nonlinear fitting results in a background curve as described before. It also requires that the background does not change shape between different sample positions in imaging or spectroscopy.

Being able to operate not only with continuous-wave light sources as conventional tapping-mode s-SNOM has several benefits for PF-SNOM. As mentioned above, the duty cycle and time that the sample is illuminated may be reduced to a minimum if the sample is photosensitive or sensitive to heating. This avoids sample destruction or unwanted modification. Furthermore, with a more flexible range of repetition rates, more light sources are available for PF-SNOM than for s-SNOM. For instance, 1-100 kHz optical parametric amplifier systems in the midinfrared region cannot be used with s-SNOM but with PF-SNOM.

In an alternative embodiment, PF-SNOM can employ a broader wavelength range outside the mid-infrared spectral region, for example the ultraviolet, visible, near-infrared and terahertz or far-infrared region. QCLs and optical parametric oscillators (OPOs) and amplifiers exist as pulsed and continuous-wave light sources in the infrared. The UV, visible and near-infrared is covered by laser sources such as solid state lasers, diode lasers, fiber lasers, OPOs or gas lasers, as well as laser sources based on nonlinear frequency conversion comprising optical parametric generation, sum-frequency generation, harmonic generation, frequency combs, and related methods. In the terahertz spectral region terahertz quantum cascade lasers are emerging, while terahertz gas lasers, terahertz antennas or free-electron lasers already exist to cover that range.

Another embodiment is suitable to perform near-field spectroscopy using a broadband light source, such as a laser-driven plasma source, a globar, supercontinuum source or a synchrotron. These sources are able to cover several 100s of $cm^{-1}$ in one shot whereas a QCL delivers a narrow laser line of typically ~1 $cm^{-1}$ width. A broadband optical parametric oscillator or amplifier delivering pulses of several 10s to a few 100s of cm−1 is also sufficient. The setup is identical to FIG. 1 when replacing the laser with a broadband source. But now a PF-SNOM near-field interferogram is obtained. This is done by changing in the asymmetric Michelson interferometer the relative optical path length between the reference arm 124 and the arm that contains the tip 116 in FIG. 1. Usually the retroreflector in the reference path 124 is moved to achieve this, for example using a motorized stage. The PF-SNOM signal is extracted according to the procedures described above while the relative path length is changed. In one embodiment the path length is changed step-wise and after each step the PF-SNOM signal is obtained at a certain tip-sample distance d, e.g. d=1 nm, and possibly averaged of a certain number of PFT cycles. The resulting data set contains an interferogram, i.e. the PF-SNOM signal at a certain distance d as a function of the relative path length of the two interferometer arms. A subsequent Fourier Transform results in the PF-SNOM near-field spectrum as a function of wavelength. This procedure can be used to acquire spectra from a broadband source. In a different embodiment the path length is changed continuously and not step-wise.

Besides the above embodiment of PF-SNOM where the distance between the AFM tip and the sample is periodically oscillating by modulation of the sample position, the same effect of distance oscillation can be achieved through oscillating the position of the AFM tip. In that embodiment, the position of the AFM tip can be externally driven below the mechanical resonant frequency of the cantilever, and correlative near-field signal and tip-sample distance measurements with PF-SNOM can be performed. Note that the tip motion in this embodiment is different from the resonant oscillations of the cantilever in the tapping mode s-SNOM. In PF-SNOM, the position oscillation of the AFM tip avoids being driven at the resonant frequency of the AFM cantilever. The cantilever under PF-SNOM operation does not store kinetic energy in the form of resonant oscillations. In contrast, in tapping mode s-SNOM, the cantilever oscillation is driven at the resonant frequency of the cantilever. As the result, the cantilever oscillation may change phase upon the interaction with the sample, which renders the determination of the tip-sample distance difficult at a given time.

Figure 5:
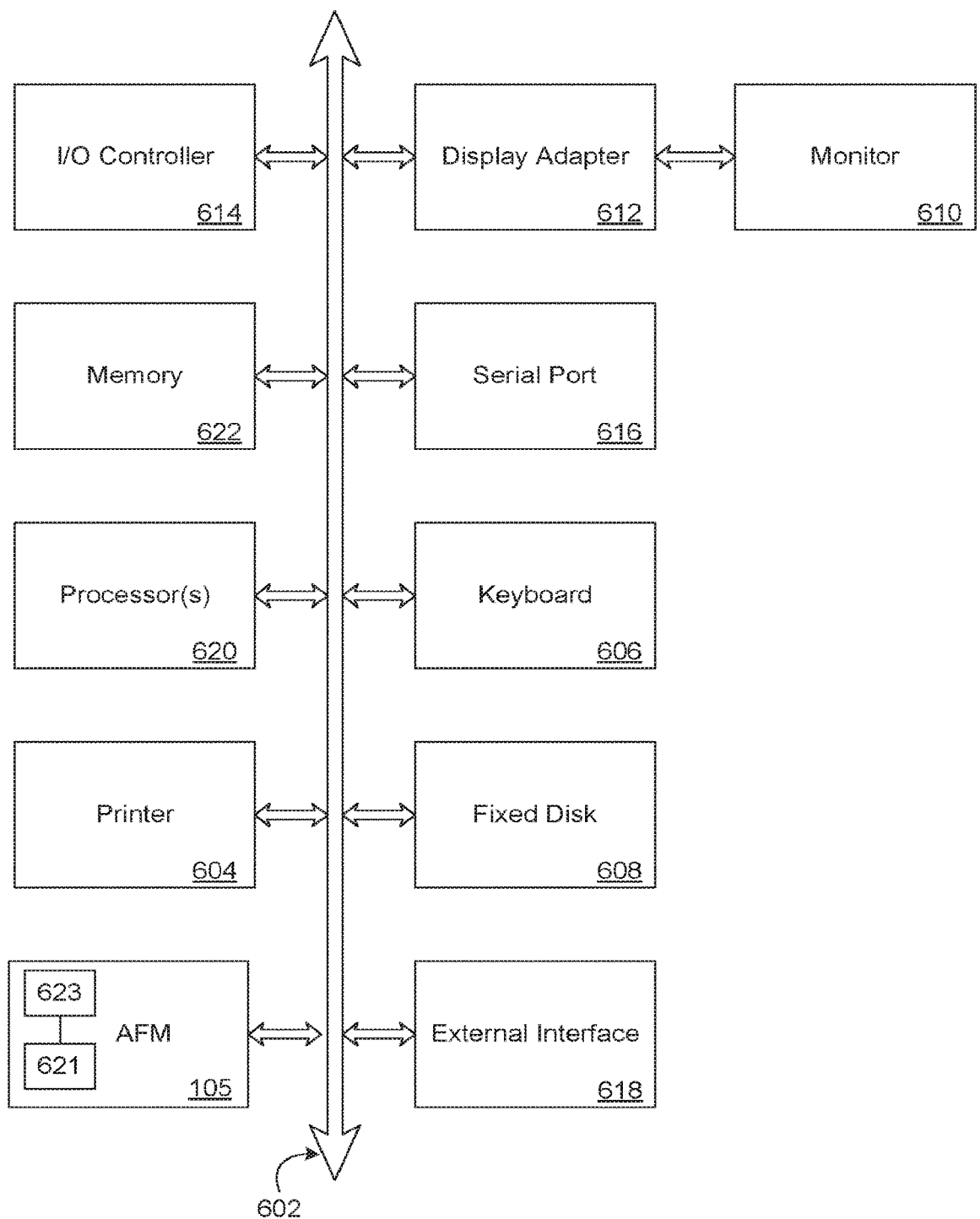
FIG. 5 is a diagram illustrating elements or components that may be present in a computer device or system configured to implement a method, process, function, or operation in accordance with an embodiment.

FIG. 5 is a diagram illustrating elements or components that may be present in a computer device or system configured to implement a method, process, function, or operation in accordance with an embodiment. In accordance with one or more embodiments, the system, apparatus, methods, processes, functions, and/or operations for enabling efficient configuration and presentation of a user interface to a user based on the user's previous behavior may be wholly or partially implemented in the form of a set of instructions executed by one or more programmed computer processors such as a master control unit (MCU), central processing unit (CPU), or microprocessor. Such processors may be incorporated in an apparatus, server, client or other computing or data processing device operated by, or in communication with, other components of the system. As an example, FIG. 5 is a diagram illustrating elements or components that may be present in a computer device or system 600 configured to implement a method, process, function, or operation in accordance with an embodiment. The subsystems shown in FIG. 5 are interconnected via a system bus 602. Additional subsystems include a printer 604, a keyboard 606, a fixed disk 608, and a monitor 610, which is coupled to a display adapter 612. Peripherals and input/output (I/O) devices, which couple to an I/O controller 614, can be connected to the computer system by any number of means known in the art, such as a serial port 616. For example, the serial port 616 or an external interface 618 can be utilized to connect the computer device 600 to further devices and/or systems not shown in FIG. 5 including a wide area network such as the Internet, a mouse input device, and/or a scanner. The interconnection via the system bus 602 allows one or more processors 620 to communicate with each subsystem and to control the execution of instructions that may be stored in a system memory 622 and/or the fixed disk 608, as well as the exchange of information between subsystems. The system memory 622 and/or the fixed disk 608 may embody a tangible computer-readable medium.

In this embodiment, an AFM 105 may also be coupled to the bus 602 via an interface (not shown). Thus, the operations and procedures discussed above may be initiated and executed using the processor 620 of the overall computing system 600 or using an onboard processor 621 at the AFM 105. Further, data determined and collected with the AFM 105 may be stored at the memory 622 of the computing system 600 or may be stored at a local memory 623 associated with the AFM 105.

It should be understood that the present disclosures as described above can be implemented in the form of control logic using computer software in a modular or integrated manner. Based on the disclosure and teachings provided herein, a person of ordinary skill in the art will know and appreciate other ways and/or methods to implement the present disclosure using hardware and a combination of hardware and software.

Any of the software components, processes or functions described in this application may be implemented as software code to be executed by a processor using any suitable computer language such as, for example, Assembly language Java, JavaScript, C, C++ or Perl using, for example, conventional or object-oriented techniques. The software code may be stored as a series of instructions, or commands on a computer readable medium, such as a random-access memory (RAM), a read only memory (ROM), a magnetic medium such as a hard-drive or a floppy disk, or an optical medium such as a CD-ROM. Any such computer readable medium may reside on or within a single computational apparatus and may be present on or within different computational apparatuses within a system or network.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments and does not pose a limitation to the scope of the disclosure unless otherwise claimed. No language in the specification should be construed as indicating any non-claimed element as essential to each embodiment of the present disclosure.

Different arrangements of the components depicted in the drawings or described above, as well as components and steps not shown or described are possible. Similarly, some features and sub-combinations are useful and may be employed without reference to other features and sub-combinations. Embodiments have been described for illustrative and not restrictive purposes, and alternative embodiments will become apparent to readers of this patent. Accordingly, the present subject matter is not limited to the embodiments described above or depicted in the drawings, and various embodiments and modifications can be made without departing from the scope of the claims below.

That which is claimed is:

1. A method for measuring an optical property of a sub micrometer region of a sample using an atomic force microscope, the method comprising:
    causing a probe to interact with a sample;
    illuminating the sample with a beam of light from a radiation source such that light is scattered from a probe-sample interaction region;
    collecting, using a detector, scattered light from the probe-sample interaction region and background regions as a function of a distance between the probe and the sample; and
    constructing a near-field signal in response to the collected scattered light relative to the distance; and
    where a vertical resolution of the near-field signal is at least 7 nm.

2. The method of claim 1, wherein constructing the near-field signal further comprises:
    extrapolating a linear function of the distance dependent scattered light responses when the scattered light is dominated by scattered light from the background regions at larger tip-sample distances; and
    subtracting the extrapolated linear function from the scattered light when the scattered light is not dominated by scattered light from the background regions at smaller tip-sample distances.

3. The method of claim 1, wherein constructing the near-field signal further comprises:
    extrapolating a quadratic function of the distance dependent scattered light responses when the scattered light is dominated by scattered light from the background regions at larger tip-sample distances; and
    subtracting the extrapolated quadratic function from the scattered light when the scattered light is not dominated by scattered light from the background regions at smaller tip-sample distances.

4. The method of claim 1, wherein constructing the near-field signal further comprises:
    extrapolating a polynomial function of the distance dependent scattered light responses when the scattered light is dominated by scattered light from the background regions at larger tip-sample distances; and
    subtracting the extrapolated polynomial function from the scattered light when the scattered light is not dominated by scattered light from the background regions at smaller tip-sample distances.

5. The method of claim 1, further comprising determining tomographic sections of spatial near-field response maps of the sample for a plurality of tip-sample distances.

6. The method of claim 1, further comprising the step of creating spatial near-field response maps for at least one specific vertical tip-sample distance wherein at least one map has a spatial resolution of 20 nm or better.

7. The method of claim 1, further comprising the step of creating spatial near-field response maps for at least one specific vertical tip-sample distance wherein at least one map has a spatial resolution of 5 nm or better.

8. The method of claim 1, where the vertical resolution of the near-field signal is at least 1 nm.

9. The method of claim 1, where a spatially resolved near-field response map is created for at least one specific vertical tip-sample distance and where the map comprises at least 100×100 pixels and is completed in less than 30 minutes.

10. The method of claim 1, further comprising varying a wavelength of the radiation source to determine a near-field spectrum corresponding to a dependence of the near-field scattering on wavelength.

11. The method of claim 1, further comprising determining a snap-in contact time ts, corresponding to when the tip-sample distance is zero, to serve as a synchronization point to predictably determine the tip-sample distance from a probe deflection signal and correlate the probe deflection signal to the scattered light signal.

12. The method of claim 1, further comprising determining a detachment time td corresponding to when the tip-sample distance ceases to be zero to serve as a synchronization point to predictably determine the tip-sample distance from a probe deflection signal to correlate to the scattered light signal.

13. The method of claim 11, wherein the near-field signal originates from a plurality of cycles synchronously averaged to increase signal-to-noise ratio.

14. The method of claim 1, further comprising interferometrically amplifying the scattered light signal at an optical detector using an optical interferometer.

15. The method of claim 1, wherein a wavelength of the light source comprises a range from ultraviolet wavelength to far-infrared wavelength.

16. The method of claim 1, wherein the causing the probe to interact with the sample further comprises causing the probe to interact with the sample in peak-force tapping mode.

17. An atomic force microscope (AFM) for measuring an optical property of a sub micrometer region of a sample comprising:
 a probe to interact with a sample;
 a radiation source illuminating the sample with a beam of light such that light is scattered from a probe-sample interaction region;
 a detector to detect scattered light from the probe-sample interaction region and a background region as a function of a distance between the probe and the sample; and
 a processor that constructs a near-field signal in response to the detected scattered light relative to the distance, and wherein the vertical resolution of the near-field signal is at least 7 nm.

18. The AFM of claim 17, wherein the processor constructs spatial near-field response maps for at least one specific vertical tip-sample distance, wherein at least one map has a spatial resolution of 20 nm or better.

19. The AFM of claim 17, wherein the processor constructs spatial near-field response maps for at least one specific vertical tip-sample distance, wherein at least one map has a spatial resolution of 5 nm or better.

20. The AFM of claim 17, wherein the vertical resolution of the near-field signal is at least 1 nm.

* * * * *